United States Patent Office 2,887,518
Patented May 19, 1959

2,887,518

ALKYLATION OF BENZENE

Herman S. Bloch, Chicago, and George L. Hervert, Downers Grove, Ill., assignors, by mesne assignments, to Universal Oil Products Company, Chicago, Ill., a corporation of Delaware No Drawing. Application June 27, 1955
Serial No. 518,382

11 Claims. (Cl. 260—671)

This application is a continuation-in-part of our co-pending application, Serial No. 234,473, filed June 29, 1951, now abandoned.

This invention relates to a process for alkylating benzene and is particularly adapted to the production of benzene alkylates utilized as intermediates in the synthesis of water-soluble detergents and surface active agents in which the alkyl group substituted thereby on the aryl nucleus is a long chain aliphatic radical. More specifically, the invention concerns an alkylation process wherein benzene is condensed with an olefin-acting alkylating agent in the presence of sulfuric acid alkylation catalyst and a particular class of inert compounds which reduce the consumption of reagents and reactants in the alkylation reaction mixture and enhance the yield of alkylate product.

An object of this invention is to provide a process for the alkylation of benzene in which the alkylate product may be readily washed to remove acidic contaminants without troublesome emulsification of the hydrocarbon and aqueous phases. Another object of the invention is to provide an alkylation process for condensing benzene with an olefinic hydrocarbon alkylating agent in which both the benzene and the alkylation catalyst are conserved to provide a more economical process for alkylation.

In one of its embodiments, this invention concerns a process for alkylating benzene with an olefin-acting alkylating agent containing from about 9 to about 18 carbon atoms per molecule in the presence of a mineral acid alkylation catalyst and in admixture with from about 5% to about 100% by weight, based on the quantity of benzene charged into the reaction, of an inert diluent free of tertiary carbon atoms and boiling below about 150° C. and selected from the group consisting of saturated hydrocarbons and saturated halogen-substituted hydrocarbons.

A more specific embodiment of the invention concerns a process for producing an alkylbenzene which comprises reacting an olefinic hydrocarbon containing from 9 to about 18 carbon atoms per molecule with benzene in the presence of sulfuric acid containing less than 10% by weight of water and in admixture with from about 5 to about 100% by weight of the quantity of benzene utilized in the reaction of an inert diluent free from tertiary carbon atoms and boiling below about 150° C. and selected from the group consisting of the saturated hydrocarbons and the saturated halogen-substituted hydrocarbons, thereafter separating a resulting catalyst phase from a resulting hydrocarbon-containing phase, separating said inert diluent from said hydrocarbon-containing phase and recycling said diluent to the alkylation reaction.

Other objects and embodiments of the invention relating to specific reactants, alternative means of effecting the alkylation reaction, catalytic agents, etc. will be referred to in greater detail in the following further description of the invention.

In the condensation of aromatic hydrocarbons with olefin-acting alkylating agents such as an olefin itself, an alcohol or an alkyl halide in the presence of acidic catalysts which promote the condensation reaction, several competing reactions between the reagents and charging stocks take place within the reaction mixture aside from the desired condensation of the aromatic and olefinic reactants. The extent to which these side reactions take place determines to a large extent the yield of the desired alkylate product. Thus, when utilizing an aromatic hydrocarbon having more than one nuclearly substitutable hydrogen atom capable of replacement by an entering alkyl substitutent, a polyalkylate may be produced, although usually in relatively minor yields. In contact with a highly acidic alkylation catalyst, the olefin-acting alkylating agent may undergo polymerization and/or hydrogen-exchange reactions to form a higher molecular weight polymer of the alkylating agent and/or a saturated analog of the alkylating agent, in addition to a more highly unsaturated product resulting from the loss of hydrogen from the alkylating agent or a polymer thereof in the exchange reaction. Still another type of reaction which generally takes place in the alkylation reaction mixture during contact of the acidic catalyst with the reactants, a reaction which occurs as the result of the presence of branched chain isomers in most alkylating agents and particularly when the latter is a long chain olefinic hydrocarbon generally comprising a mixture of the various isomers of a given molecular weight, is the fragmentation or cracking of the alkylating agent, resulting in the formation of a large proportion of shorter chain length alkylates. These side reactions all of which produce measurable yields of undesired products of the alkylation reaction occur at least to some extent in all aromatic hydrocarbon alkylation reactions employing alkylating agents containing more than about 8 carbon atoms per molecule. The amounts of such by-products which appear in admixture with the desired mono-alkylate having a single long chain alkyl group per aromatic nucleus depends upon the relative rates of the above reactions in competition with the desired mono-alkylation reaction and rates vary for each aromatic hydrocarbon selected as charging stock and for the reaction conditions utilized. On the basis of extensive investigations of such alkylation reactions by the prior art utilizing various types of alkylating agents, aromatic hydrocarbon charging stocks, and acidic alkylation catalysts, certain fundamental generalizations have been derived from the results of such investigations which correlate the yield and physical properties of the alkylate with the above factors. It has been observed, for example, that alkylate produced in a reaction catalyzed by sulfuric acid containing not more than about 10%, and preferably from 1.5 to about 5%, by weight of water is much more desirable for certain purposes than alkylate formed in the presence of other catalysts such as hydrogen fluoride, aluminum chloride, etc. The product of sulfuric acid catalyzed reactions, for example, produces a more suitable charging stock to be sulfonated for detergent products because of the production of a different isomeric form of the alkylate which when sulfonated yields a product of more desirable physical properties and detergency. Another observation from such research is that the rate of benzene alkylation is much slower than for toluene or other nuclearly-substituted aromatic hydrocarbons, and as a result of such reduced rate of alkylation, the effects of the above-indicated side reactions become more pronounced, the yield of the desired mono-alkylate of benzene per mole of charge stock introduced into the reaction being substantially reduced, accompanied by a corresponding increase in the production of undesirable by-products such as polyalkylate, cracked and polymerized products of olefinic character and hydrogen exchange reaction products. The consumption of sulfuric acid catalyst per mole of mono-alkylate produced is also substantially greater in benzene alkylation because of the production of such by-products and the tendency of the catalyst to combine therewith to form a sludge. The net result of these various effects in the alkylation of benzene is to greatly increase the cost of the desired product and to create a waste acid disposal problem of greater magnitude.

It has now been discovered that the process for alkylating benzene may be greatly improved insofar as yield of mono-alkylate product, reduced consumption of benzene, alkylating agent and sulfuric acid catalyst by carrying out the alkylation reaction in the presence of an inert diluent of the charging stock which is free of tertiary compounds. It is believed that in the presence of the inert diluent in the reaction mixture the alkylating agent soluble in the inert diluent is dispersed and contacts the sulfuric acid catalyst less freely, thereby reducing the activity of the catalyst with respect to the alkylating agent and simultaneously reducing the quantity of alkylating agent involved in the various side reactions hereinabove referred to. It has now been further discovered, however, that if the saturated, inert diluent comprises compounds containing one or more tertiary carbon atoms, that is, carbon atoms substituted by three radicals or groups other than hydrogen, the yield of alkylate is less than the yield obtained in an alkylation reaction utilizing a saturated, inert diluent in which tertiary carbon atoms form no portion of the structure of such diluent. It has been noted, for example, that in an alkylation reaction utilizing an inert paraffinic hydrocarbon diluent and an olefinic hydrocarbon alkylating agent, the amount of paraffinic product corresponding in molecular weight to the olefinic hydrocarbon feed stock (on the basis of the number of carbon atoms in the respective paraffinic and olefinic components present in the alkylation reaction product) varies directly with the amount of paraffinic hydrocarbons containing tertiary carbon atoms which are present in the paraffinic inert diluent charged to the alkylation reaction mixture. Thus, for example, when an isoparaffin is present in a mixture of paraffins utilized as inert diluent in the alkylation of benzene, or when the diluent contains isonaphthenes (naphthenes having a nuclear alkyl substituent), the amount of paraffins in the product corresponding in molecular size to the olefinic feed stock (for example, dodecane when the olefin alkylating agent feed is a dodecylene such as propylene tetramer) is directly proportional to the content of said isoparaffins and isonaphthenes contained in the diluent, regardless of the fact that no paraffins having the molecular size of the olefinic feed were originally present in the organic diluent. Furthermore, the elimination of organic compounds containing tertiary carbon atoms from the inert diluent, such as the elimination of isoparaffins and isonaphthenes from a paraffinic hydrocarbon diluent, increases the yield of alkylate substantially while correspondingly reducing the production of paraffins corresponding in molecular size to the olefinic feed stock. The role of isoparaffins and isonaphthenes or other saturated compounds containing tertiary carbon atoms in reducing the yield of alkylate is believed to be that of a component capable of forming a carbonium ion by hydrogen exchange with another carbonium ion in the presence of active acid-acting catalysts. In the case of an isoparaffin present in a saturated, paraffinic hydrocarbon inert diluent charged to an alkylation reaction, a hydrogen exchange reaction between the isoparaffin and olefinic charging stock is believed to occur by virtue of the following reaction mechanism:

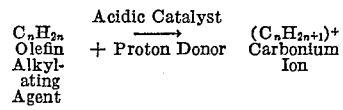

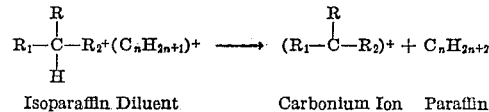

where the cation: $(C_nH_{2n+1})^+$ represents a carbonium ion derived from the long chain olefin charged to the alkylation reaction and the compound $C_nH_{2n+2}$ represents the corresponding paraffin formed by virtue of the hydrogen exchange reaction occurring in the alkylation reaction catalyzed by means of an acid-type catalyst. The carbonium ion:

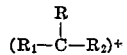

thus formed as a result of the hydrogen exchange which occurs during the alkylation reaction may then alkylate a benzene nucleus, may add to an olefinic hydrocarbon and form a polymer, or it may undergo other side reactions to form undesirable by-products of the reaction. Whatever type of reaction the latter carbonium ion enters into, an undesirable reduction in either the benzene or olefinic hydrocarbon alkylating agent charged to the reaction occurs and ultimately reduces the yield of desired alkylate by reducing the benzene and alkylating agent available for the formation of alkylate.

Since benzene particularly resists alkylation to a greater extent than toluene or other substituted aromatic compounds, the use of an inert diluent free of tertiary carbon atoms is especially important to effect an increase in the yield of mono-alkylate product. Toluene and other nuclearly-substituted aromatic compounds, in fact, alkylate with such ease that the effect of other side reactions during the alkylation is hardly noticeable and the alkylation reaction does not have to compete with such side reactions. Consequently, no substantial advantage is realized in utilizing the present diluent for such alkylation reactions. In the case of benzene, however, the side reactions proceed at a faster rate than the desired alkylation reaction and a considerable proportion of the olefin-acting alkylating agent may be consumed prior to the formation of the desired alkylate. It follows, therefore, that in an alkylation reaction utilizing benzene and an olefin-acting alkylating agent as charging stocks, and in the absence of isoparaffins, isonaphthenes or other saturated organic compounds containing tertiary carbon atoms, the desired alkylation reaction does not have to compete with side reactions involving compounds containing tertiary carbon atoms for the olefinic alkylating agent; consequently, a greater proportion of the latter olefins are consumed in the formation of the desired alkylate. Furthermore, it has been found that the presence of the diluent in the benzene alkylation process produces a greater yield of alkylate, with less benzene and sulfuric acid consumption, than an alkylation reaction in which the diluent is absent. The presence of the diluent, therefore, in the alkylation of benzene results in substantial economic advantages.

Suitable olefin-acting alkylating agents utilizable in the alkylation or condensation reaction to form the alkylate product thereof with the benzene charging stock may be selected from certain organic compounds capable of acting as olefins in the presence of mineral acid alkylation catalysts and containing from about 9 to about 18 carbon atoms per molecule. The present process is thus applicable to alkylating agents of either straight, branched chain or cyclic structure having a chain length in which the alkylating portion of the molecule contains from about 9 to about 18 carbon atoms in that portion of the molecule transferred to the aromatic nucleus in the alkylation reaction. Olefinic hydrocarbons containing fewer than about 9 carbon atoms per molecule, such as propylene, pentene, hexylene etc. are not advantageously utilized as alkylating agents herein in an acid-catalyzed reaction because their benzene alkylates are not useful as detergents and wetting agents. On the other hand, olefinic hydrocarbons containing more than 18 carbon atoms per molecule resist alkylation in the presence of benzene and an acid-acting catalyst because of the weakness of the olefinic bond in such olefins of excessively high molecular weight. Olefinic hydrocarbons containing from about 9 to about 18 carbon atoms per molecule may be derived from any suitable source, including the dehydrogenation of paraffinic hydrocarbons, dehydration of alcohols, polymerization of lower molecular weight olefins, such as the various fractions of propylene polymerization products, the polymers containing from 9 to about 18 carbon atoms per molecule being especially suitable for the production of alkylates utilizable as intermediates in the ultimate production of alkylaryl sulfonate detergents. The olefinic alkylating agent may consist of one or more individual olefinic hydrocarbon components of homologous or analogous structure and may consist of primary, secondary or tertiary olefins and the olefinic bond may occur between any pair of carbon atoms in the molecular chain. Other suitable olefin-acting alkylating agents utilizable, although with less preference than the olefins themselves, include the alkyl halides, dialkyl ethers, mercaptans, aldehydes, alcohols, ketones, alkyl esters, such as the alkyl acid sulfates, etc. in which the alkyl group transferred to the aryl nucleus during the condensation reaction contains from about 9 to about 18 carbon atoms per group.

The material utilized in the present alkylation process as an inert diluent thereof is further characterized as a saturated organic compound free of tertiary carbon atoms and is preferably selected from the saturated hydrocarbons and certain of their halogen-substituted analogues. It is thus intended to specifically exclude from the organic diluent any substantial proportion of such compounds as the isoparaffins and isonaphthenes and their derivatives, the excluded compounds containing carbon atoms in their molecular structures having three of their valence bonds satisfied by an alkyl, alkenyl or other hydrocarbon radical. Other classes of compounds utilizable as inert organic diluents under certain conditions include such compounds as the nitroparaffins, the alkane sulfonic acids, the sulfones, etc., containing no tertiary carbon atoms. The undesirable isoparaffins and isonaphthenes may be removed from a given charge of inert diluent by continuously recycling it in the process, a substantial proportion of the components containing tertiary carbon atoms being removed in the initial alkylation, the remainder, therefore, consisting almost entirely of refractory or inert compounds, such as normal paraffins and naphthenes. The inert diluent is desirably an organic compound which boils at a temperature considerably above or below the boiling point of the alkylate, and preferably substantially below its initial boiling point, such that the organic mixture which separates from the used catalyst phase of the alkylation reaction mixture may be readily fractionated to recover the diluent separately from the aromatic hydrocarbon alkylate without formation of azeotropes etc. Since most alkyl aromatic hydrocarbons containing alkyl groups having at least 4 carbon atoms per group boil at temperatures at least above about 150° C., it is preferred that the inert diluent boil at least below about 150° C. and more preferably, below about 100° C. Suitable diluents having these characteristics include, for example, n-butane, n-pentane, n-hexane, n-heptane, etc., or mixtures thereof. A particularly useful source of inert diluent, which may also contain the aromatic hydrocarbon to be alkylated is a paraffin-aromatic hydrocarbon mixture separated from petroleum as an appropriately boiling fraction such as a "straight run" petroleum distillate, or a natural gasoline fraction, or a hexane-heptane-benzene fraction recovered by distillation of a straight-run petroleum naphtha, boiling, for example from about 60° to about 90° C. and from which the isoparaffins and naphthenes have been removed by prior use and recycle in the process.

The catalyst utilized herein to effect the condensation of the aromatic hydrocarbon charging stock with the olefinic alkylating agent, is sulfuric acid of at least 90% concentrations (i.e. not over 10% water), and preferably of from 95 to 98.5% sulfuric acid. A particularly preferred catalyst is sulfuric acid containing at least 95% and preferably 98.5% sulfuric acid and particularly a used isoparaffin alkylation catalyst (containing alkyl sulfates therein which reduce olefin consumption and in other respects promote the alkylation reaction by virtue of their emulsifying action on the hydrocarbon and acid phases). Such used sulfuric acid isoparaffin alkylation catalysts may contain up to about 15% by weight of organic material and up to about 7.5% by weight of water, the acid being preferably fortified with a reagent capable of reacting with the water in the spent acid to form sulfuric acid, such as concentrated sulfuric acid, oleum, or sulfur trioxide to reduce its water content to from 5 to 2.5% by weight. A portion of the partially spent acid phase of the present process, separated from the hydrocarbon alkylation products by decantation therefrom, may be recycled in combination with fresh alkylation catalyst.

The condensation of the alkylating agent with benzene may be effected in the presence of the indicated sulfuric acid alkylation catalyst and in admixture with the inert diluent at temperatures of from about —10° to about 100° C., preferably from about 0° to about 50° C., and at pressures sufficient to maintain the reactants and catalyst in substantially liquid phase during the course of the reaction. For the purpose of producing the monoalkyl alkylate product, it is generally preferred to charge an excess of the benzene reactant into the alkylation zone, based upon the quantity of olefin required to form the monoalkylate, generally from 1:1 to about 10:1 molecular proportions of benzene to olefinic alkylating agent. The inert diluent is desirably charged to the alkylation reaction in admixture with one of the reactants in an amount of from about 5% to about 100% by weight of the benzene charged to the reaction. The mixture is preferably thoroughly stirred during the reaction, usually for a period of from about 0.2 to about 2 hours. Following the reaction, the mixture is permitted to settle in order to stratify the used catalyst phase from the hydrocarbon product in admixture with inert diluent, the separated phase being recovered by simple decantation. The recovered hydrocarbon phase is washed with water or caustic before separating the diluent, alkylate, unused reactants, etc. therefrom, and it is in this stage of the process that the presence of the diluent in the product is highly advantageous in eliminating the problem of emulsification between the hydrocarbon and aqueous phases, a problem associated with the alkylation in which no diluent is utilized. The inert diluent is preferably separated from the hydrocarbon phase, for example, by distillation of the washed hydrocarbon phase and thereafter recycled to the alkylation zone, since any reactive components of the diluent initially charged to the first alkylation stage are substantially completely removed, leaving only refractory components.

EXAMPLE

A series of four alkylation reactions effected under otherwise identical conditions, but under differing conditions with respect to the presence or absence of an organic diluent in the alkylation reaction mixture was completed to determine the relative effects of the diluent and its composition on the yield and quality of alkylate product. In each of the four reactions, a temperature of 0° C. was maintained during the alkylation reaction and the charging stocks were likewise mixed at this temperature, the aromatic to olefin molar ratio (moles of benzene per mole of dodecylene) was maintained at 10:1 in the reaction mixture, the reactants were mixed and allowed to contact the acid catalyst for a space time of approximately 40 minutes in each case, the hydrocarbon to acid catalyst volume ratio was maintained throughout the reaction at 3:1, and the fresh acid catalyst was 98.5% sulfuric acid charged into the alkylation reaction mixture at a make-up rate of 1.25 pounds per pound of olefin charged to the reaction. In reaction A, a diluent consisting of "Skellysolve B" (an acid-treated light naphtha fraction containing 47% n-hexane, 3% cyclohexane, 12% methylcyclopentane and 38% $C_6$—$C_7$ isoparaffins) in an amount representing 43% by weight of the benzene charged to the alkylation reaction mixture was utilized as an inert diluent. In Experiment B, conducted at otherwise identical reaction conditions as the aforementioned experiment A, normal heptane in an amount equivalent to 43% by weight of the benzene charged was utilized as organic diluent. In Experiment C, no diluent whatsoever was utilized in the alkylation reaction conducted at otherwise identical reaction conditions as Experiments A and B, and in Experiment D, also conducted at the above reaction conditions and utilizing 43% by weight of diluent based on the benzene charged, methylcyclopentane was utilized as diluent. The following Table I presents the reaction conditions and the results of the experiments in tabulated form:

Table I

Alkylation of Benzene with Dodecylene (Propylene Tetramer, B.P. 170-225° C.) in the Presence of an Acid Catalyst, With and Without Paraffinic Diluent.

| Experiment | A | B | C | D |
|---|---|---|---|---|
| Conditions: | | | | |
| Temperature, °C | | 0 | | |
| Aromatic: Olefin ratio, moles | | 10 | | |
| Hydrocarbon: Acid ratio, volume | | 3 | | |
| Space time, minutes | | 40 | | |
| Make-up Acid rate, lbs./lb. olefin | | | | |
| Inert Diluent | "Skellysolve B" | N—$C_7H_{16}$ | None | Methylcyclopentane |
| Yields: | | | | |
| Dodecylbenzene, 275–325° C., lbs./lb. olefin feed | 0.81 | 1.02 | 0.97 | 0.50 |
| Percent of theoretical | 55 | 70 | 66 | 23 |
| Dodecane in hydrocarbon product, lbs./lb. olefin | 0.15 | 0.03 | 0.03 | 0.46 |
| Benzene Consumption: Moles benzene/mole dodecylbenzene | 1.9 | 1.5 | 1.7 | 2.1 |
| Acid Consumption: Lbs./lb. of Alkylate | 1.6 | 1.2 | 1.3 | 2.62 |
| Behavior of Alkylate in Caustic Scrubbing: Emulsion formation | no | no | yes | no |

Prior to distillation of the hydrocarbon layer of the alkylation reaction product in order to separate unused starting materials and the alkylate product of the desired boiling range from the crude alkylation mixture it is necessary to wash the hydrocarbon layer of the alkylation reaction mixture with an aqueous alkaline solution to remove acid sulfate esters, entrained sulfuric acid catalyst and other acidic materials to thereby avoid discoloration and decomposition of the alkylate which would otherwise occur if the alkylate were to be distilled without a caustic wash to remove these acidic substances. The alkylate prepared in the presence of the paraffinic diluent may be caustic washed readily with no tendency toward emulsification of the hydrocarbon phase in the aqueous caustic; no problem is therefore encountered in separating the washed alkylate from the aqueous phase, the alkylate containing the diluent separating as a distinct clear, hydrocarbon phase with no intermediate emulsion between the aqueous and hydrocarbon layers immediately after shaking the caustic and hydrocarbon mixture together. The hydrocarbon layer separated from the acid phase of the alkylation reaction mixture in which no diluent was present during the reaction produces an emulsion which is difficult to separate into hydrocarbon and aqueous phases when shaken with dilute aqueous caustic and then only by adding a large quantity of salt to precipitate the emulsion.

The above results indicate the outstanding advantage of utilizing an inert diluent containing paraffinic hydrocarbons having no tertiary carbon atoms in the molecular structure of the diluent hydrocarbon. Indeed, the presence of a diluent in which 50% of the hydrocarbons contain tertiary carbon atoms actually reduces the yield of dodecylbenzene below the yield obtained in the absence of any diluent whatsoever. Only a diluent free from tertiary carbon atoms combines the advantages of freedom from emulsification troubles with an actual improvement in alkylate yield and a decrease in reactant and catalyst consumption.

We claim as our invention:

1. The process which comprises alkylating benzene with an olefin containing from about 9 to about 18 carbon atoms per molecule in substantially liquid phase and in the presence of a sulfuric acid alkylation catalyst and in admixture with from about 5 to about 100% by weight of the benzene charged of an inert diluent free of tertiary carbon atoms and boiling at a temperature below the boiling point of said olefin, said diluent being selected from the group consisting of the saturated hydrocarbons and the saturated halogen-substituted hydrocarbons boiling at a temperature less than about 100° C., and thereafter separating the resultant reaction mass into a used catalyst phase and a hydrocarbon phase comprising alkylate in admixture with said diluent.

2. The process of claim 1 further characterized in that said inert diluent is a paraffinic hydrocarbon.

3. The process of claim 2 further characterized in that said paraffinic hydrocarbon is normal heptane.

4. The process of claim 2 further characterized in that said paraffinic hydrocarbon is selected from the group consisting of n-pentane, n-hexane and n-heptane.

5. The process of claim 1 further characterized in that a major proportion of said olefin is dodecylene.

6. The process of claim 1 further characterized in that said sulfuric acid alkylation catalyst comprises a used isoparaffin alkylation acid catalyst containing a maximum of about 7.5% water.

7. The process of claim 1 further characterized in that said alkylation catalyst comprises a used isoparaffin sulfuric acid alkylation catalyst, fortified with a reagent which yields sulfuric acid in contact with water selected from the group consisting of concentrated sulfuric acid containing less than 5% water, sulfur trioxide and a sulfuric acid oleum.

8. The process of claim 1 further characterized in that said hydrocarbon phase is separated into an alkylate fraction, a benzene fraction and a diluent fraction, said benzene and diluent fractions being recycled to said alkylation reaction.

9. The process which comprises alkylating benzene with an olefin containing from about 9 to about 18 carbon atoms per molecule in substantially liquid phase and in the presence of sulfuric acid of at least 95% concentration and in admixture with from about 5% to about 100% by weight of the benzene charged of an inert saturated hydrocarbon diluent free of tertiary carbon atoms and boiling at a temperature below the boiling point of said olefin and below about 100° C., separating the resultant reaction mass into an acid layer and an essentially hydrocarbon layer containing the benzene alkylate, the diluent and acidic substances, washing the last-mentioned layer with an aqueous alkaline solution to remove said acidic substances therefrom, and thereafter separating the benzene alkylate from the diluent.

10. The process of claim 9 further characterized in that said diluent is predominantly paraffinic.

11. The process of claim 9 further characterized in that said diluent separated from the benzene alkylate is recycled to the alkylating step.

References Cited in the file of this patent
UNITED STATES PATENTS

| | | |
|---|---|---|
| 2,436,480 | Mavity | Feb. 24, 1948 |
| 2,456,199 | Friedman et al. | Dec. 14, 1948 |
| 2,479,120 | Johnstone | Aug. 16, 1949 |